UNITED STATES PATENT OFFICE.

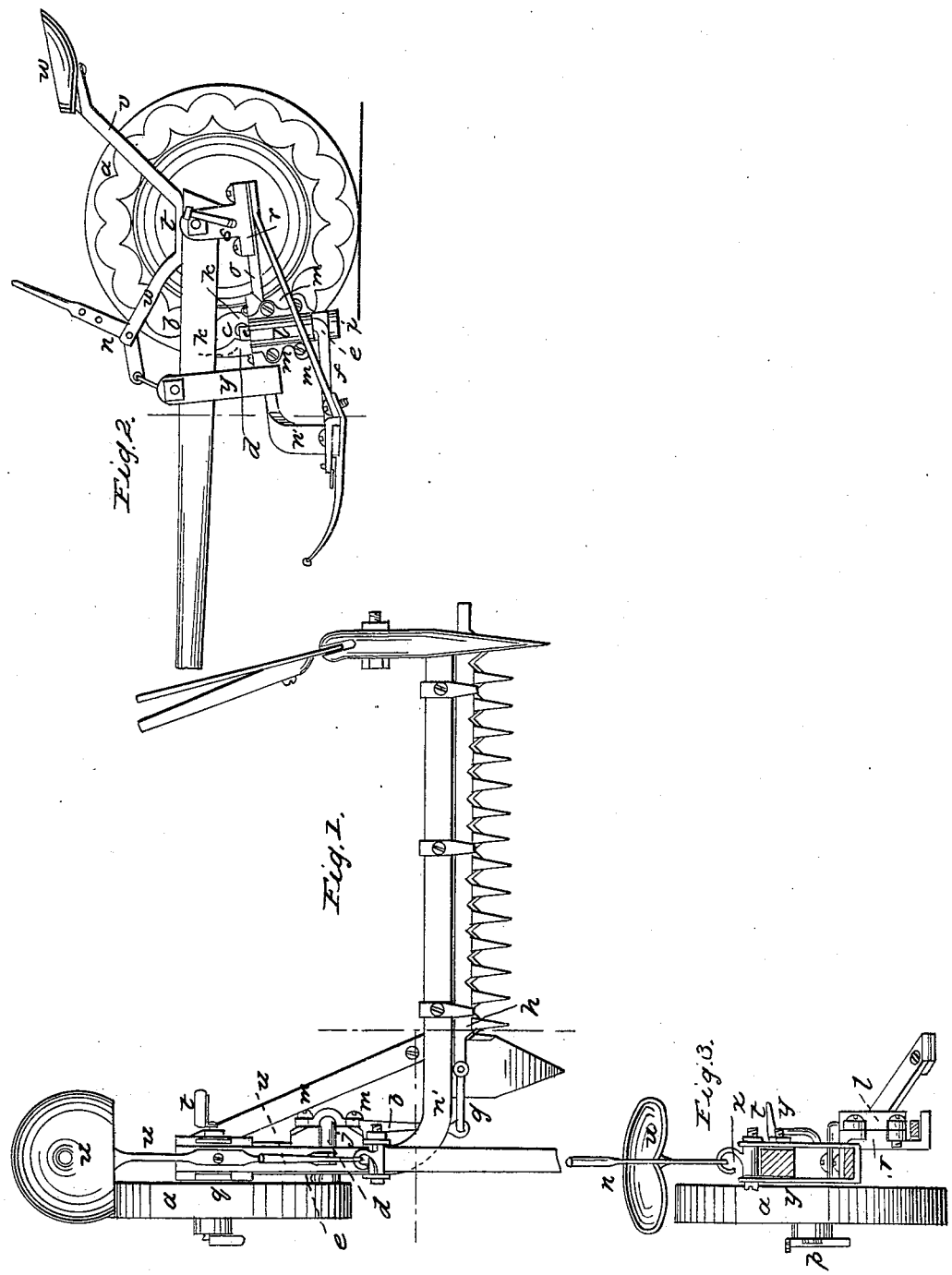

JOHN FOX AND SAMUEL C. RIDGAWAY, OF BALTMORE, MARYLAND.

IMPROVEMENT IN HARVESTERS.

Specification forming part of Letters Patent No. 53,969, dated April 17, 1866.

*To all whom it may concern:*

Be it known that we, JOHN FOX and SAMUEL C. RIDGAWAY, of the city of Baltimore, in the State of Maryland, have invented a certain new and useful Improvement in Harvesters; and we do hereby declare that the following is a full, clear, and exact description of the same, reference being had to the accompanying drawings, and to the letters and marks thereon.

Our improvement has reference particularly to the harvester constructed by B. F. Ray, certain parts of which were made the subject of Letters Patent bearing date February 15, 1859, and other certain parts also, made the subject of other Letters Patent bearing date January 21, 1862, the general character of which harvester is based upon the means that operate the reciprocating cutter-bar, and certain special features of the frame-bar and the cutter-bar, and an arrangement of the bearings and bosses of the rocker-shaft, in combination with the friction-roller and cam-groove.

The drawings forming part of this specification show the Ray harvester alluded to with our improvement forming part thereof, Figure 1 being a view had by looking down upon the machine; Fig. 2, an inner side view of the same, and Fig. 3 a front view of the machine, the frame of the cutter-bar and other parts being omitted.

In each of these figures, where like parts are shown, like marks and letters are used to indicate the parts.

The main or driving wheel $a$ has the cam-groove $b$, within which moves the conical roller $c$, connected to the end of the rocker-shaft arm $d$, as in the Ray machine. This arm $d$ is at right angles to the rocker-shaft $e$, the shaft passing down through a box that both surrounds and supports it, and having at its lower end another arm, $f$, also at right angles to it, which arm $f$, by a link, $g$, is connected to the cutter-bar $h$.

The lower end of the rocker-shaft $e$ has a bearing in the bottom piece, $i$, of the box, as is shown by Fig. 2 of the drawings. The box is made of two pieces, the one, $j$, being secured to the frame-bar by screws $k$, the other, $l$, being secured to the piece $j$ by screws $m$. The form and arrangement of the rocker-shaft $e$ and its arms, and of the box $j$ and $l$, admit of the curve or bend of the frame and cutter-bar being made at a point in the main frame of the machine much nearer the center of the driving-wheel than in the machine above alluded to, thereby materially lessening the weight of the machine in front, and rendering the raising and lowering of the cutter, cutter-bar, &c., easier by the lever $n$.

It will be noticed that the frame-bar of the cutter-bar has a curve or bend upward, $n'$, and is connected to, or forms a part of, the frame-bar $o$, so that the one is at right angles to the other, this position and relation of the one to the other being fully and clearly indicated by Figs. 1 and 2 of the drawings.

The axle or shaft $p$ of the main driving-wheel is an extension from the box-frame, which has its upright parts $q$ and $s$, and its base or bottom part $r$, the whole being by casting one piece of metal. The upright parts $q$ and $s$ constitute the bearing for the inner end of the pole and a support for the rest $t$, for the driver's foot, while the bottom or base part $r$ is secured to the frame-bar $o$. Thus the bearing of the tongue or pole is upon the axle or shaft of the driving-wheel instead of being upon the main frame-bar, near the front part, as in the Ray machine.

The driver's seat $u$ rests upon the back end of a spring-bar, $v$, which is attached to the tongue or pole above, or nearly above, the axle of the driving-wheel, by which attachment and a seat, fixed or movable, the weight of the driver can be made to balance the weight of the machine so far as the weight of the driver may go as against the weight of the machine.

The spring-bar $v$ may be continued on in connection with the part secured to the pole or tongue, and be extended out to form the bearing-piece $w$ for the lever $n$, or the bearing-piece $w$ may be a separate piece secured to the pole part. In either case, the fulcrum of the lever $n$ being in the end of the piece $w$, the weight of the machine, when raised by the lever through the joint-piece $x$ and bars $y$, will be brought nearer to the axle of the driving-wheel and not so much upon the neck of the horses, as is the case with the Ray machine.

What we claim as our invention, and desire to secure by Letters Patent, is—

1. The box-frame constructed by casting the same as one piece, whereby the bearings for the pole and the driver's foot-rest and the main or driving wheel axle, and the means for connecting the same with the frame-bar of the machine are made up of one piece of metal, as herein recited.

2. The arrangement of the driver's seat $u$, the bars $v$ and $w$, the lever $n$, bars $y$, and the pole, in their relation to each other and to the driving-wheel and the machine, as and for the purposes herein set forth.

This specification signed this 18th day of January, 1866.

JOHN FOX.
SAML. C. RIDGAWAY.

Witnesses:
  THOS. T. EVERETT,
  T. SMITH.